United States Patent [19]

Kosaka et al.

[11] Patent Number: 4,734,394

[45] Date of Patent: Mar. 29, 1988

[54] PROCESS FOR PRODUCING MOLECULAR SIEVE CARBON FIBERS

[75] Inventors: Atushi Kosaka, Nishio; Makoto Takemura, Okazaki; Naohisa Ohyama, Nishio; Minoru Hatano, Aichi, all of Japan

[73] Assignee: Nippon Soken, Inc., Nishio, Japan

[21] Appl. No.: 898,775

[22] Filed: Aug. 19, 1986

Related U.S. Application Data

[62] Division of Ser. No. 720,378, Apr. 5, 1986, abandoned.

[30] Foreign Application Priority Data

Apr. 26, 1984 [JP] Japan .................................. 59-82818

[51] Int. Cl.$^4$ ........................ B01J 20/30; B01J 20/28; D01F 9/12
[52] U.S. Cl. ........................................ 502/434; 55/74; 55/75; 55/389; 55/527; 264/29.2; 423/447.2; 423/447.6; 502/433; 502/435
[58] Field of Search ...................... 502/433, 434, 435; 423/447.6, 447.7, 447.8, 447.1, 447.2; 264/29.2

[56] References Cited

U.S. PATENT DOCUMENTS

| | | | |
|---|---|---|---|
| 4,014,725 | 3/1977 | Schulz | 423/447.1 |
| 4,197,283 | 4/1980 | Crepaux et al. | 423/447.2 |
| 4,484,938 | 11/1984 | Okamoto et al. | 55/269 |
| 4,552,148 | 11/1985 | Gomi et al. | 423/447.8 |

FOREIGN PATENT DOCUMENTS

| | | | |
|---|---|---|---|
| 101024 | 6/1982 | Japan | 423/447.1 |
| 199922 | 10/1985 | Japan | 264/29.2 |

*Primary Examiner*—Paul E. Konopka
*Attorney, Agent, or Firm*—Cushman, Darby & Cushman

[57] ABSTRACT

Molecular sieve carbon fibers capable of separating and purifying nitrogen from air in large quantities are provided. The carbon fibers have diameters of 5 to 50 μm and micropores opening directly at the surface of the carbon fibers with pore sizes of 0.5 nm or less. They are capable of separating nitrogen at a purity of 98% or higher, even 99.9% or higher from air, etc., with a relatively low adsorbing pressure and deadsorbing vacuum. The molecular sieve carbon fibers do not deteriorate during operation since they are resistant to division or powdering and the adsorbing pressure and deadsorbing vacuum are relatively low.

3 Claims, 5 Drawing Figures

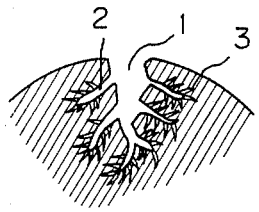
Fig. 1 PRIOR ART
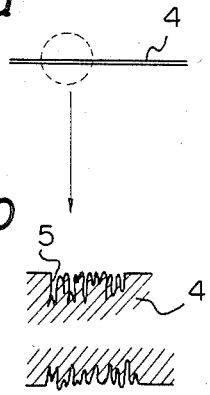
Fig. 2a
Fig. 2b
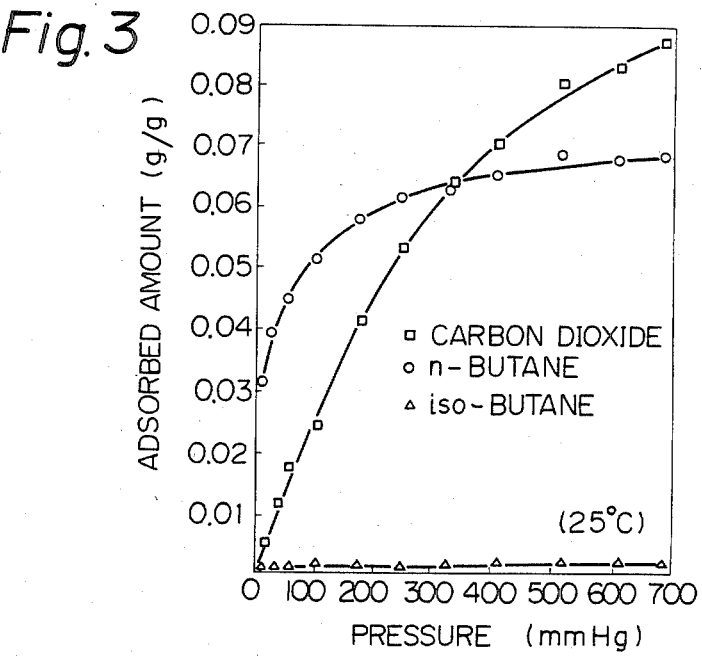
Fig. 3

PROCESS FOR PRODUCING MOLECULAR SIEVE CARBON FIBERS

This is a division of application Ser. No. 720,378, filed Apr. 5, 1986, which was abandoned upon the filing hereof.

BACKGROUND OF THE INVENTION

1. Field of the Invention

The present invention relates to a nitrogenoxygen separating molecular sieve and separator, more specifically, a molecular sieve comprised of carbon fibers capable of separating and purifying a high purity of nitrogen gas from air and a separator using such a sieve.

2. Description of the Related Art

A large quantity of nitrogen gas is used in industry for creating inert atmospheres in heating furnaces, etc. It is known to prepare nitrogen gas by liquefying air and fractionally distilling nitrogen gas from the liquid air using the difference of the liquefying temperatures. Nitrogen gas prepared by liquefaction and fractional distillation of air is, however, relatively expensive.

A nitrogen gas generating apparatus using an inorganic material of the zeolite series is also known, but a drying device is necessary in the apparatus at a stage before an adsorbing column due to the high water adsorption of zeolite, making the cost of the apparatus high.

Nitrogen gas generators using molecular sieves are also commercially available. Nitrogen gas generation with molecular sieves enables preparation of nitrogen gas in large quantities and a very low cost in relation to nitrogen gas generation by liquefaction and fractional distillation of air.

A typical molecular sieve material used in commercially available nitrogen gas generators is "molecular sieve carbon", a particulate carbon material. Various processes have been disclosed for producing such molecular sieve particulate carbon. In one process, raw materials of a phenol or furan series resin are adsorbed in the surfaces of a porous carbon adsorbent and then polymerized and/or condensed. Carbonization is then carried out to form a fine porous structure in the adsorbent (Japanese Examined Patent Publication (Kokoku) No. 49-37036). In another process, a hydrocarbon which will produce carbon by thermal decomposition is added to coke, which is then heat-treated to deposit carbon into the fine pores of the coke (Japanese Examined Patent Publication (Kokoku) No. 52-18675). In still another process, an organic material which is tacky at room temperatures is mixed with fine particulate coal char, which is then granulated and carbonized (Japanese Unexamined Patent Publication (Kokai) No. 57-175715).

The pore sizes of fine pores of a nitrogenoxygen separating molecular sieve, however, must be controlled to within the range of 0.5 nm or less, preferably from approximately 0.35 nm to approximately 0.5 nm. All methods for producing a nitrogen-oxygen separating molecular sieve from particulate carbon involve very complicated and highly controlled procedures.

Due to the inherent features of raw materials of porous particulate carbons, molecular sieve particulate carbons have the construction of fine pores as shown in FIG. 1, which includes macropores (with a large pore size) 1, transitional pores (with intermediate pore sizes) 2, and micropores (with finest pore sizes) 3, continuously from the surface into the interior of a particulate carbon. Thus, effective micropores 3 having a pore size of from 0.35 nm to 0.5 nm are formed only in the interior of the particles. Therefore, a relatively high adsorbing pressure and deadsorbing vacuum are necessary for pressure swing adsorption in a nitrogen generator. The high adsorbing pressure and deadsorbing vacuum necessitate expensive vacuum pumps and other devices. Further, a high adsorbing pressure and/or deadsorbing vacuum can split or powder molecular sieve particulate carbons due to the mechanically weak pore structure of the molecular sieve particulate carbons Further, molecular sieve particulate carbons have a relatively small effective geometrical surface area, increasing the size of a nitrogen generator.

A process for producing a molecular sieve in the form of fiber, i.e., a molecular sieve carbon fiber, has also been disclosed (Japanese Unexamined Patent Publication (Kokai) No. 57-101024). This process includes melt spinning a material depolymerized from coal, produced by a special method, followed by infusibilization and slight carbonization and activation. This process, however, requires a special raw material for spinning and, more importantly, cannot produce carbon fibers having a narrow distribution of a pore size in the range of 0.5 nm or less with a large effective fine pore volume. It activates the carbon fibers from the outside with steam, etc. Steam, etc. at a low temperature of 650° C. to 700° C. is not effective for activation. Therefore, even if effective fine pores having a pore size of 0.35 to 0.5 nm may be formed, they are few in number. Activation at a higher temperature to increase the volume of pores makes those pore sizes too large, i.e., larger than 0.5 nm. Thus, control of activation is extremely difficult or impossible. In any case, activation of fibers from the outside is not sufficient for providing molecular sieve carbon fibers effective for separating nitrogen and oxygen. The examples or other portions of the above patent publication, therefore, describe or mention only separation between benzene and cyclohexane, not between nitrogen and oxygen.

SUMMARY OF THE INVENTION

An object of the present invention is to provide a nitrogen-oxygen separating molecular sieve and separator capable of separating and purifying high purity nitrogen gas.

Another object of present invention is to provide a nitrogen-oxygen separating molecular sieve and separator operable for separating and purifying high purity nitrogen gas under a relatively low adsorbing pressure and deadsorbing vacuum.

A further object of the present invention is to provide a nitrogen-oxygen separating molecular sieve and separator not susceptable to division or powdering of the molecular sieve.

The present invention resides in a nitrogen-oxygen separating molecular sieve, and, a separator using the same, including carbon fibers of a diameter in the range from 5 to 50 μm and many micropores opening directly at the surface of the carbon fibers and having pore sizes of 0.5 nm or less.

BRIEF DESCRIPTION OF THE DRAWINGS

FIG. 1 is a partial sectional view of a molecular sieve particulate carbon, illustrating the pore structure thereof;

FIGS. 2a and 2b are side and partial sectional views of a molecular sieve carbon fiber, the latter illustrating the pore structure of the molecular sieve carbon fiber according to the present invention;

FIG. 3 shows adsorption characteristics of molecular sieve carbon fibers; and

DESCRIPTION OF THE PREFERRED EMBODIMENTS

Figure 4:
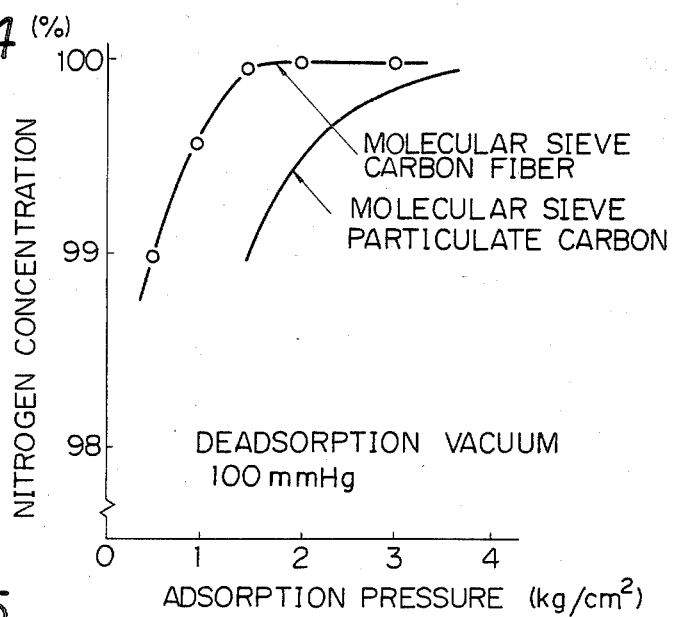
FIGS. 4 and 5 show adsorption pressure and deadsorption vacuum characteristics of molecular sieves according to the present invention and prior art.

While the exact purity of nitrogen gas used in large quantities in industry, such as for heat treatment, depends on the individual application, separating and purifying high purity nitrogen gas from a gas mixture containing nitrogen and oxygen such as air requires that the molecular sieve carbon material have fine pores of pore sizes in the range of from approximately 0.35 nm to approximately 0.5 nm, in particular, near 0.4 nm, since the molecules of nitrogen and oxygen are very close in size. (Generally, nitrogen molecules are at the longest 0.41 nm and at the shortest 0.30 nm and oxygen molecules are at the longest 0.38 nm and at the shortest 0.28 nm.) Prior art processes for producing molecular sieve particulate carbons cannot easily attain such a narrow distribution of fine pore sizes since, as described before, molecular sieve particulate carbons have a wide distribution of pore sizes from macropores to micropores and effective micropores having pore sizes of 0.35 to 0.5 nm are formed only in the interior of the particulate carbon.

The inventors found that carbon fibers with micropores having a narrow distribution of pore sizes can be made by introducing some kinds of material into green fibers after spinning, followed by carbonizing the fibers at a relatively low temperature. FIG. 2 (a) shows a carbon fiber 4, manufactured by the process mentioned above, and FIG. 2(b) is an enlarged sectional view of a part of the carbon fiber 4 encircled in FIG. 2(a). As shown in FIG. 2(b), a carbon fiber manufactured by the process has micropores 5 opening directly at the surface of the carbon fiber, that is, micropores are formed at the surface of the carbon fiber without macropores or transitional pores. The present invention was accomplished by applying such carbon fibers as molecular sieves for separating nitrogen and oxygen.

Nitrogen-oxygen separating molecular sieve carbon fibers according to the present invention have many advantages.

These carbon fibers have a narrow distribution of pore sizes in the range of 0.5 nm or less, particularly from 0.35 to 0.5 nm, even near 0.4 nm, due to the characteristics of the carbon fibers, the crystallinity, and the orientation of the molecules. Carbon fibers have a large effective geometrical surface area for forming desired micropores. Micropores having desired pore sizes are formed directly on the surfaces of the carbon fibers without the formation of macropores or transitional pores. These features enable separation and purification of nitrogen from air, etc. at a purity of 98 mole percent or higher, further 99 mole percent or higher, even 99.9 mole percent or higher. These high purities of nitrogen gas cannot be obtained by any carbon fibers activated according to any prior art processes.

As stated before, the carbon fibers have a large effective geometrical surface area for formation of desired micropores, and such micropores are formed directly at the surface of the carbon fibers without forming macropores or transitional pores. As a result, a relatively low adsorbing pressure and deadsorbing vacuum, compared with molecular sieve particulate carbons, can be used. This is advantageous since relatively simple and less expensive vacuum pumps and other devices can be used.

The absence of macropores and transitional pores and the relatively low adsorbing pressure and deadsorbing vacuum, plus the high mechanical strength and flexibility of carbon fibers, further prevent division or powdering of molecular sieve carbons which occurs in the case of molecular sieve particulate carbons.

The molecular sieve carbon fibers also can be manufactured by a simple process compared with processes for manufacturing molecular sieve particulate carbons.

The molecular sieve carbon fibers allow production of high purity nitrogen gas in large quantities at a considerably lower cost compared with the method of liquefaction and fractional distillation of air. A kilogram of molecular sieve carbon fibers according to the present invention, for example, can produce 1 liter of high purity nitrogen gas (e.g., 99.9 mole %) per minute from air.

Nitrogen-oxygen molecular sieve carbon fibers according to the present invention may be produced as below:

First, green fibers are spun from an organic material such as oil or coal residues, for example, pitch or coal tar from crude oil distillation or dry distillation of coal. Any conventional spinning process, typically, melt spinning, may be used. The diameter of the spun green fibers is preferably in the range from 5 to 50 $\mu m$. If the diameter of the fibers is too large, the fibers lose their flexibility and become brittle. If too small, they become inconvenient in handling. The length of green fibers is not particularly limited.

A material which can be driven out of the fibers during carbonization, for example, oxygen or ozone, is introduced into the green fibers. This introduction may be easily done by heating the green fibers in an atmosphere containing the material to be introduced. Heating in air is the most convenient. For example, heating in air at a temperature in the range of 250° C. to 450° C. for a period of time in the range of several minutes to several hours or heating in an ozone atmosphere at a temperature in the range of 50° C. to 160° C. for a period of time in the range of several minutes to several hours may be used. The fibers preferably contain 8% to 28% oxygen by weight of the total weight of the fibers after this treatment.

This treatment introduces a higher amount of oxygen than the infusibilization in the usual production of carbon fibers. Infusibilization was only necessary for preventing fusion of green fibers during carbonization. Also, the final carbon fibers were not supposed to have had pores. Therefore, a relatively slight infusibilizing treatment was effected. In contrast, in production of molecular sieve carbon fibers, an introduction treatment stronger than infusibilization is used in order to introduce oxygen, etc. into the fibers for later expulsion to form the large number of micropores. As a result, a higher temperature is preferable in the introduction treatment than the temperature used in the infusibilization.

Finally, the green fibers are carbonized. This carbonization forms micropores at the surface of the fibers by driving out the previously introduced material and imparts a certain strength to the fibers. The oxygen introduced in the fibers is emitted in the form of CO, $CO_2$, etc. This treatment, carbonization, is thus designed more to form the desired micropores than to carbonize the fibers. A lower temperature gives finer pores and a higher temperature coarser pores. A temperature in the range of 500° C. to 750° C. is preferable. The rate of temperature rise should be slow, for example, 10° C. per minute or less.

This carbonization is carried out in an atmosphere inert to carbon fiber material at the treatment temperature. Generally, inert gas such as argon or nitrogen is used in carbonization in usual carbon fiber production. However, combustion gas, i.e., a gaseous mixture of steam, carbon dioxide, and nitrogen, may be used if the treatment temperature is below approximately 700° C. This is advantageous since combustion gas is cheaper than an inert gas.

Thus, it is possible to form many (sufficient effective volume) micropores having a pore size in the range of 0.5 nm or less at the surface of carbon fibers by controlling the amount of oxygen, etc., introduced in the green fibers and the temperature of carbonization. The micropores are formed directly at the surface of the fibers due to the crystallinity and the orientation of molecules of the fibers, which are characteristics of the fibers.

EXAMPLE 1

Green fibers were melt spun in a conventional process from pitch produced by residues from the heat-cracking of naphtha. Green fibers having diameters of 10 μm to 12 μm were heated in air with a rate of temperature rise of 2° C./min and kept at 300'0 C. for 2 hours. The resultant fibers contained 12.1% oxygen by weight of the total weight of the fibers. The fibers were heated in an inert atmosphere ($N_2$) with a rate of temperature rise of 2° C./min to 690° C., kept at 690° C. for 10 minutes, and then cooled. Thus, molecular sieve carbon fibers were obtained.

EXAMPLE 2

The same green fibers as in Example 1 were heated in air with a rate of temperature rise of 2° C./min to 270° C. and kept for 2 hours at 270° C. The temperature was then further raised at a rate of 3° C./min to 420° C. and kept for 5 minutes at 420° C. At this time, the content of oxygen was 20.7 wt. %. The fibers were heated in an inert atmosphere at a rate of 4° C./min and kept at 600° C. for 1 hour.

EXAMPLE 3

Green fibers were centrifugally spun from pitch obtained by heat-treating coal tar. The fibers were heated in air at a rate of 2° C./min and kept at 300° C. for 1.5 hours. At that time, the content of oxygen was 13.2 wt. %. The fibers were heated in an inert atmosphere at a rate of 4° C./min and kept at 608° C. for 1 hour.

EXAMPLE 4

The same green fibers as in Example 1 were treated for 30 minutes at 70° C. in an atmosphere containing 1000 ppm of ozone and then heated in air at a rate of 10° C./min to 400° C. At that time, the content of oxygen was 19.8 wt%. The fibers were heated in an inert atmosphere at a rate of 4° C./min and kept at 610° C. for 1 hour.

To examine the sizes of fine pores of the molecular sieve carbon fibers of Example 1, adsorption isotherms were determined with carbon dioxide, n-butane, and isobutane at 25° C. The least size of the molecule of carbon dioxide is 0.33 nm, that of n-butane 0.43 nm, and that of isobutane 0.50 nm. The resultant adsorption isotherms are shown in FIG. 3. As seen in FIG. 3, carbon dioxide (0.33 nm) and n-butane (0.43 nm) were adsorbed in a large quantity, while isobutane (0.50 nm) was not substantially adsorbed. The molecular sieve carbon fibers of Examples 2 to 4 gave similar results as in FIG. 3.

Thus, it was confirmed that the molecular sieve carbon fibers of Examples 1 to 4 had many micropores of 0.5 nm or less in size and had substantially no pores larger than 0.5 nm in size.

The nitrogen-oxygen separating capability of the molecular sieve carbon fibers of Example 1 was tested using the pressure swing adsorption method. The apparatus used included two parallel adsorbing columns having an inner diameter of 40 mmφ and a length of 110 mm filled with molecular sieve carbon fibers, means for supplying air to the adsorbing columns, a vacuum pump for evacuating the adsorbing columns, and solenoid valves at the inlet and outlet of the adsorbing columns. Air was supplied to one of the two columns for adsorbing oxygen from the air and producing purified nitrogen gas, while the other column was evacuated for deadsorbing the oxygen which had been adsorbed by the carbon fibers in a previous adsorbing stage. The valves were automatically switched by a timer so that adsorbing and deadsorbing operations were alternately performed in the two columns and every fixed time period. The outlet of the columns was provided with a regulating valve so as to control the flow rate of the gas at 100 ml/min and with an analysator for continuously determining the concentration of oxygen.

In the test, the adsorbing pressure was varied with a fixed deadsorbing vacuum (100 mmHg), which was used prior to each adsorption operation. The deadsorbing vacuum was varied with a fixed adsorbing pressure (2 kg/cm$^2$), which was used after each deadsorption operation.

Figure 5:
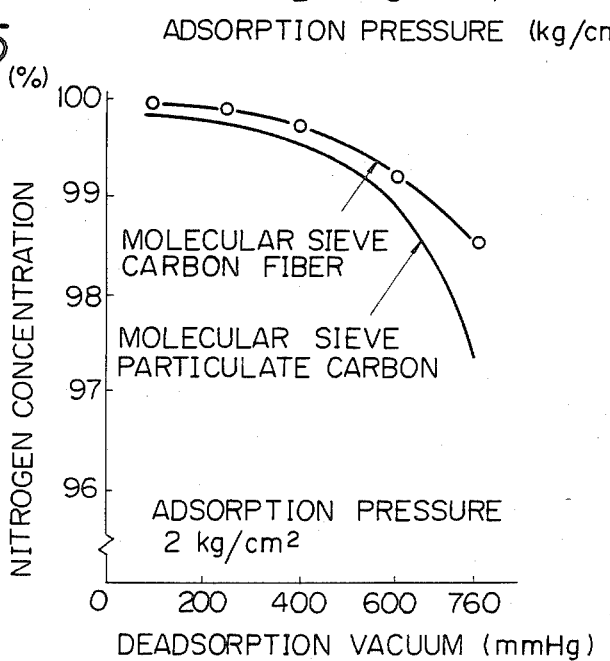

The results are shown in FIGS. 4 and 5. In FIGS. 4 and 5, results from similar tests carried out using molecular sieve particulate carbons (KURARY CHEMICAL CO. LTD.) are included for comparison.

From FIGS. 4 and 5, it is seen that the molecular sieve carbon fibers according to the present invention can separate and purify nitrogen to a desired purity with a lower adsorbing pressure and deadsorbing vacuum than in the case of molecular sieve particulate carbons. The molecular sieve carbon fibers filled simply in the columns enabled excellent separating and purification of nitrogen over a long time period without deterioration of performance or division or powdering of the carbon fibers.

Since molecular sieve particulate carbons are divided or powdered during molecular sieve operation, they must be filled in adsorbing columns in a special way with special measurements. These special measurements are not necessary in the case of molecular sieve carbon fibers according to the present invention.

Prior art carbon fibers manufactured by activating carbonization thereof cannot provide molecular sieves for separating and purifying nitrogen from air, etc. particularly at the high purity attained by molecular sieve carbon fibers according to the present invention.

The nitrogen-oxygen separating molecular sieve carbon fibers and nitrogen-oxygen separator according to the present invention may be also used for separating and purifying oxygen gas.

We claim:

1. A process for producing molecular sieve carbon fibers, comprising the steps of:

spinning a material selected from the group consisting of oil residue and coal residue to form green fibers having diameters in the range of 5 to 50 μm;

treating said green fibers in air at a temperature in a range of 250° to 450° C. to introduce oxygen into said green fibers so that an amount of oxygen introduced in said fibers which is in a range of 8 to 28% by weight of the total weight of said fibers after the oxygen is introduced;

cartionizing said fibers in an inactive atmosphere at a temperature of 500° to 750° C. whereby a component of said material, including oxygen atoms introduced thereto in said treating step is released from said fibers to form a number of micropores opening directly at the surface of said fibers, which micropores have diameters in the range of 0.5 nm and below and substantially no pores larger than 0.5 nm in size.

2. The process of claim 1, wherein said material is an oil residue pitch.

3. The process of claim 1, wherein said material is coal tar.

* * * * *